United States Patent [19]
Ito et al.

[11] Patent Number: 5,432,316
[45] Date of Patent: Jul. 11, 1995

[54] METHOD AND APPARATUS FOR STARTING LASER BEAM MACHINING WITH OPTICAL COMPONENT PROTECTION

[75] Inventors: Takayuki Ito; Hiromitsu Takahashi, Oshino, both of Japan

[73] Assignee: Fanuc Ltd., Minamitsuru, Japan

[21] Appl. No.: 295,905

[22] PCT Filed: Jan. 7, 1994

[86] PCT No.: PCT/JP94/00012

§ 371 Date: Sep. 12, 1994

§ 102(e) Date: Sep. 12, 1994

[87] PCT Pub. No.: WO94/15747

PCT Pub. Date: Jul. 21, 1994

[30] Foreign Application Priority Data

Jan. 14, 1993 [JP] Japan .................... 5-20789

[51] Int. Cl.$^6$ ............................................. B23K 26/14
[52] U.S. Cl. ............................ 219/121.83; 219/121.84
[58] Field of Search ........... 219/121.6, 121.61, 121.83, 219/121.84; 364/474.08

[56] References Cited

U.S. PATENT DOCUMENTS

| | | | |
|---|---|---|---|
| 4,315,133 | 2/1982 | Morgan et al. | 219/121.84 |
| 4,945,207 | 7/1990 | Arai | 219/121.84 |
| 5,293,023 | 3/1994 | Haruta et al. | 219/121.84 |
| 5,308,951 | 5/1994 | Mori | 219/121.84 |

FOREIGN PATENT DOCUMENTS

| | | | |
|---|---|---|---|
| 2326296 | 12/1974 | Germany | 219/121.84 |
| 2-41791 | 2/1990 | Japan | 219/121.83 |
| 3-47692 | 2/1991 | Japan . | |
| 3-230878 | 10/1991 | Japan | 219/121.6 |
| 5-69175 | 3/1993 | Japan . | |
| 5-245685 | 9/1993 | Japan | 219/121.6 |

OTHER PUBLICATIONS

"Electronics Intergration", by Mark Herman of Peterbilt Motors Co., Truck Engineering, Apr. 1991, pp. 21-23.

"Materials Put the Flex in Flexible Circuits", by Gary Chamberlain, Senior Editor, Electronic Materials, Design News, Oct. 26, 1992, pp. 92-98.

"Allison's New World Dawns", by Mike Brezonick, Diesel Progress Engines & Drives, Jan. 1992, pp. 16-20.

"Powertrain Control Interface for Electronic controls Used in Medium and Heavy Duty Diesel On-Highway Vehicle Applications", SAE Recommended Practice J1922, Draft Jul. 16, 1989.

"Future Transmissions: Here Today", *Electronics in Trucking,* by Kenneth Stadden, Technical Editor, Heavy Duty Trucking, Oct. 1989, pp. 114-119.

"New Machine Concepts: What Does the Future Hold?" by Pam Gruebnau, Managing Editor, Construction Equipment, *Fleet Management,* Apr. 1991, pp. 22-36.

"User-Friendly Electronic Powershift Transmission Controls" by Garth H. Bulgrien, SAE Technical Paper Series, SAE International, The Engineering Society for Advancing Mobility Land Sea Air and Space, International Off-Highway & Powerplant Congress and Exposition, Sep. 9-12, 1991, Milwaukee, Wisconsin, Paper No. 911831, Society of Auotmotive Engineers, Inc., pp. 9-11.

(List continued on next page.)

Primary Examiner—Geoffrey S. Evans
Attorney, Agent, or Firm—Staas & Halsey

[57] ABSTRACT

When a laser beam machining command is detected in a pre-processing step in which a machining program is analyzed to create execution data for carrying out a laser beam machining operation, a drive for rotation command is outputted to a means for driving an impeller, and when it is detected that the rotational speed of the impeller has reached a predetermined speed within a predetermined time period, laser beam machining is started. If the rotational speed of the impeller has failed to reach the predetermined speed within the predetermined time period, an alarm is outputted. With this arrangement, the rotation of the impeller, which is necessary for the protection of optical components, can be controlled properly without the need of separately defining impeller rotation-related commands in the machining program.

6 Claims, 7 Drawing Sheets

OTHER PUBLICATIONS

"Serial Data Communications Between Microcomputer Systems in Heavy Duty Vehicle Applications", *Truck and Bus Practice*, by SAE International (Society of Automotive Engineers, Inc.), The Engineering Society for Advancing Mobility Land Sea Air and Space, Submitted for recognition as an American National Standard, Pennsylvania, Issued–Jan. 1986; Revised–Nov. 1989 Revised–Aug. 1990; pp. 1–11.

"Those Smart Engines", by Murray Clifford, Truck Australia, Electronic Engines, Jan/Feb 1991, pp. 16–21.

"Morse's New Engine Speed Switch", IMO Industries, Inc., Morse Controls Division, Hudson, Ohio, 1990.

"The New Morse Electronic I–MAXX Control for ZF ECOMAT Transmissions" by IMO Industries Inc., Morse Controls Division, 1990.

"New Morse TCU, An Electronic Transmission Control For Solenoid Actuated Powershift Transmissions", IMO Industries I Inc., Morse Controls Divisions, 1988.

"The PTO Speed Control For DDEC Electronic Governors" by IMO Industries Inc., Morse Controls Divisions, 1985.

"APC100–Automatic Powershift Control" by Clark Components International Inc., A Business Unit of Clark Equipment Co., Power Transfer Systems, circa 1990.

"Detroit Diesel Series 60, First in Electonic Technology" by Detroit Diesel Corporation of Detroit, Michigan, circa 1990.

"SEAMAXX–The New Generation of Intelligent Yet Simple Electronic Engine Controls" by IMO Industries Inc., Morse Controls Division, Hudson, Ohio, Form No. SM1092, Oct. 1992.

"The Electro–Maxx Control System–For Standard Allison Automatic Transmissions" by IMO Industries Inc., Morse Control Division, Hudson, Ohio, Form No. EMS–6–91, Jun. 1991.

"Flexible Circuit Design Guide"by Sheldahl, Second Edition, circa 1990.

METHOD AND APPARATUS FOR STARTING LASER BEAM MACHINING WITH OPTICAL COMPONENT PROTECTION

TECHNICAL FIELD

The present invention relates to an improvement of a laser beam machining control apparatus equipped with a contaminant repellent member, such as a rotary impeller, for preventing contaminants produced during laser beam machining from adhering to optical components and the like of a laser beam machine, and to a laser beam machining control method using the apparatus.

BACKGROUND ART

Already known are laser beam machines, in which an impeller rotatable at high speed is arranged between an optical component forming a light path and a workpiece to be machined, to prevent contaminants such as sputters, oil mist, etc. produced during machining from adhering to optical components of the laser beam machine.

Figure 7:
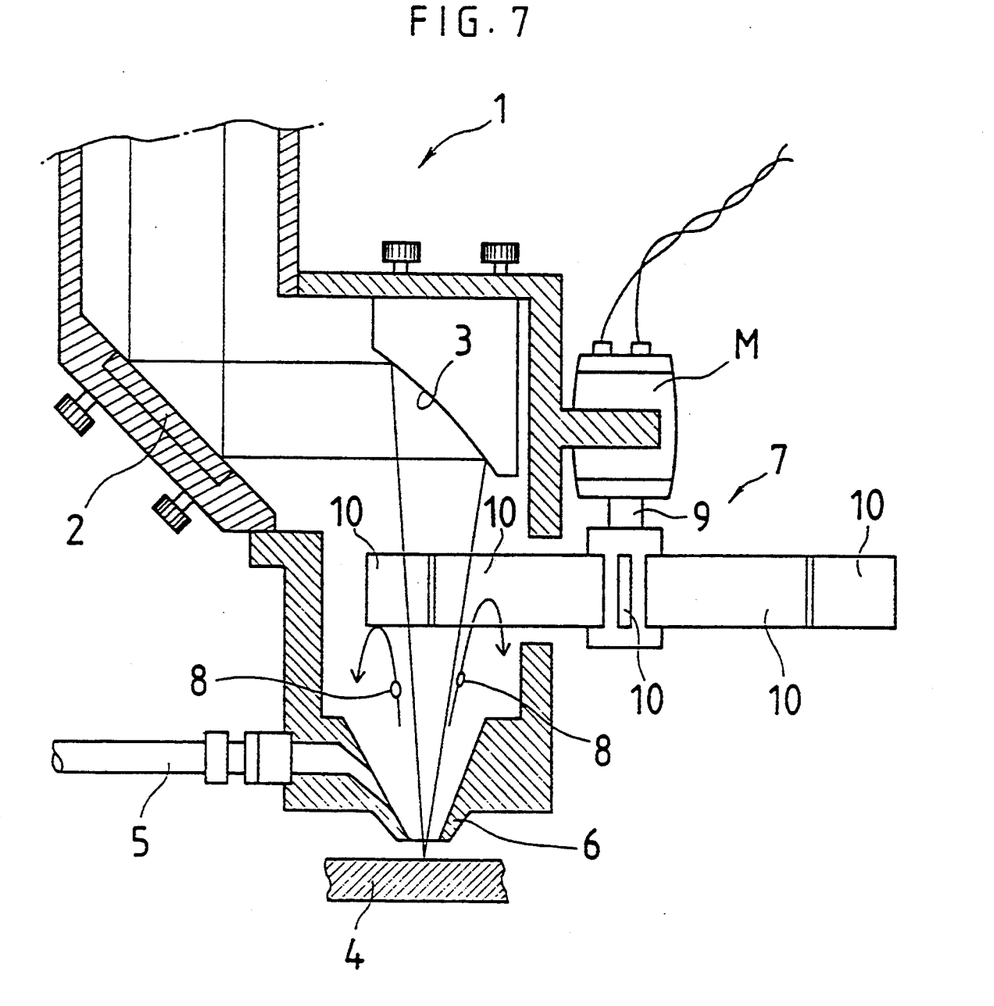
FIG. 7 is a sectional side elevation schematically showing a principal part of a conventional laser beam machine equipped with an impeller rotatable at high speed.

A principal part of a conventional laser beam machine of this type provided with an impeller rotatable at high speed is schematically shown in the sectional side elevation of FIG. 7. In the figure, a laser beam emitted from a laser oscillator is reflected at a mirror 2 in a machining head 1 toward a parabolic mirror 3 and then focused by the parabolic mirror 3 to irradiate a workpiece 4 to be machined. Also, an assist gas is introduced into the machining head 1 from supply means, not shown, through a pipe 5, and then supplied to the workpiece 4 after being throttled by a nozzle 6 mounted to a distal end of the machining head 1, thereby melting the workpiece 4 for machining by the interaction of the laser beam and the assist gas.

An impeller is arranged between the parabolic mirror 3, which is the endmost optical component for the laser beam emission, and the workpiece 4. The impeller 7 comprises a rotary shaft 9 to be rotated at high speed by a motor M as rotating means, and a plurality of vanes 10 attached radially to the rotary shaft 9, and repels contaminants 8 scattering from the surface of the workpiece 4, thereby preventing the contaminants 8 from adhering to the parabolic mirror 3. That is, the impeller 7 functions as a contaminant repellent member.

The impeller 7 is rotated by the motor M at such a high speed that the contaminants 8 scattering from the surface of the workpiece 4 during machining are struck by at least one vane 10 without fail while they pass through the rotating vanes 10 from below. The scattering contaminants 8 are thus surely repelled by the vanes 10, whereby the contaminants 8 are prevented from reaching the parabolic mirror 3.

In the conventional laser beam machine, however, rotation of the impeller 7 is controlled by means of general-purpose commands which are independent commands designed for ON/OFF control of external equipment; therefore, rotation of the impeller 7 cannot be controlled unless such commands are specified in a machining program.

The following is an example of a machining program for a conventional laser beam machine equipped with the impeller 7:

| Line No. | | Statement |
|---|---|---|
| 1. | L | P[1] 100 mm/sec FINE |
| 2. | | DO[1] = ON |
| 3. | | LASER START |
| 4. | L | P[2] 100 mm/sec CONT 100 |
| 5. | L | P[3] 100 mm/sec FINE |
| 6. | | LASER END |
| 7. | | DO[1] = OFF |
| 8. | [END] | |

In the above program, the statements of Line No. 1, 4 and 5 are declarations for commanding movements to target positions P[1], P[2] and P[3] which have respectively been defined in advance in the machining program, moving speeds, interpolation types and the like. The statement of Line No. 3 is a declaration for commanding a pre-flow (preliminary emission of the assist gas) and the start of emission of the laser beam. The statement of Line No. 6 is a declaration for commanding the end of emission of the laser beam and an after-flow (continued emission of the assist gas for a predetermined time), and the statement of Line No. 8 is a declaration for commanding the end of the program. The statements of Line No. 2 and 7 are independent general-purpose commands used for ON/OFF control of external equipment; in the above example, the commands are used for ON/OFF control of the motor M which controls the rotation of the impeller 7.

As long as contaminants 8 scatter from the workpiece during a laser beam machining, the motor M must be driven to rotate the impeller 7, and therefore "DO[1]=ON" must be defined before the statement "LASER START". Further, at a stage in the program where a laser beam machining for a specific part is ended or the entire machining program ends, "DO[1]=OFF" must be defined to stop the rotation of the impeller 7. Setting of these statements for ON/OFF control is left entirely to an operator who prepares the machining program. Thus, if the operator forgets setting the rotation start command "DO[1]=ON", laser beam machining is carried out with the impeller 7 stopped, thereby causing the fear of having the contaminants 8 adhere to the parabolic mirror 3. Even though the rotation start command is set at a proper location, contaminants 8 will not be fully repelled if laser beam machining is started before the rotational speed of the impeller 7 reaches a predetermined speed, possibly contaminating the parabolic mirror 3. Further, if the statements for ON/OFF control are frequently used in cases where laser beam machining is started after it is ascertained that the rotational speed of the impeller 7 has reached the predetermined speed, loss of time associated with increase of the rotational speed is accumulated, prolonging the overall machining time.

DISCLOSURE OF THE INVENTION

An object of the present invention is to eliminate the above drawbacks of the prior art, and to provide a laser beam machining control apparatus and method capable of accurately controlling the operation of a contaminant repellent unit, such as an impeller, for preventing contaminants from adhering to optical components without the need of specifying the command relating to the rotation of the impeller one by one in a machining program, thereby permitting efficient laser beam machining operation.

To achieve the above object, according to the laser beam machining control method of the present invention, a laser beam machining control apparatus comprises a contaminant repellent unit, such as an impeller, arranged between a workpiece to be machined and an optical component forming a light path for a laser beam, and actuation control means for operating the contaminant repellent unit, and designed for outputting a drive command to the actuation control means when a laser beam machining command is detected in a pre-processing step in which a machining program is analyzed to create execution data for achieving a laser beam machining operation; and starting laser beam machining operation when it is detected that the contaminant repellent unit has attained a predetermined operating condition such as a predetermined rotational speed within a predetermined time period, and outputting an alarm when the contaminant repellent unit does not attain the predetermined operating condition within the predetermined time period.

The present invention also provides a laser beam machining control apparatus comprising: a contaminant repellent unit such as an impeller arranged between a workpiece to be machined and an optical component forming a light path for a laser beam, which is emitted through operation of a laser oscillator; operation control means for switching on and off the contaminant repellent unit in accordance with a laser beam machining start command and a laser beam machining end command, respectively; operating state detecting means for detecting an operating state such as the rotational speed of the contaminant repellent unit; signal output means for generating a signal when the operating state such as the rotational speed detected by the operating state detecting means has attained a preset state; and machining start commanding means for providing an operation start command to the laser oscillator upon detecting the signal from the signal output means.

Preferably, the laser beam machining control apparatus according to the present invention further comprises a time measuring means for measuring a time elapsed from generation of the laser beam machining start command, and an alarm output means for outputting an alarm when supplied with no signal from the signal output means within a preset time period.

As seen from the above, according to the present invention, the control section of the laser beam machine first analyzes a machining program in the pre-processing step, to create execution data for achieving a laser beam machining operation. Then, when a laser beam machining command is detected in the pre-processing step, the control section of the laser beam machine outputs a rotation command to the means for rotating the impeller, and determines whether the operating state of the contaminant repellent unit has attained the predetermined operating state within the predetermined time period. When it is ascertained that the operating state of the contaminant repellent unit has attained the predetermined state within the predetermined time period, laser beam machining operation is started in accordance with the machining program. If the operating state of the contaminant repellent unit does not attain the predetermined state within the predetermined time period, an alarm is outputted to notify abnormality.

BEST MODE FOR CARRYING OUT THE INVENTION

Figure 5:
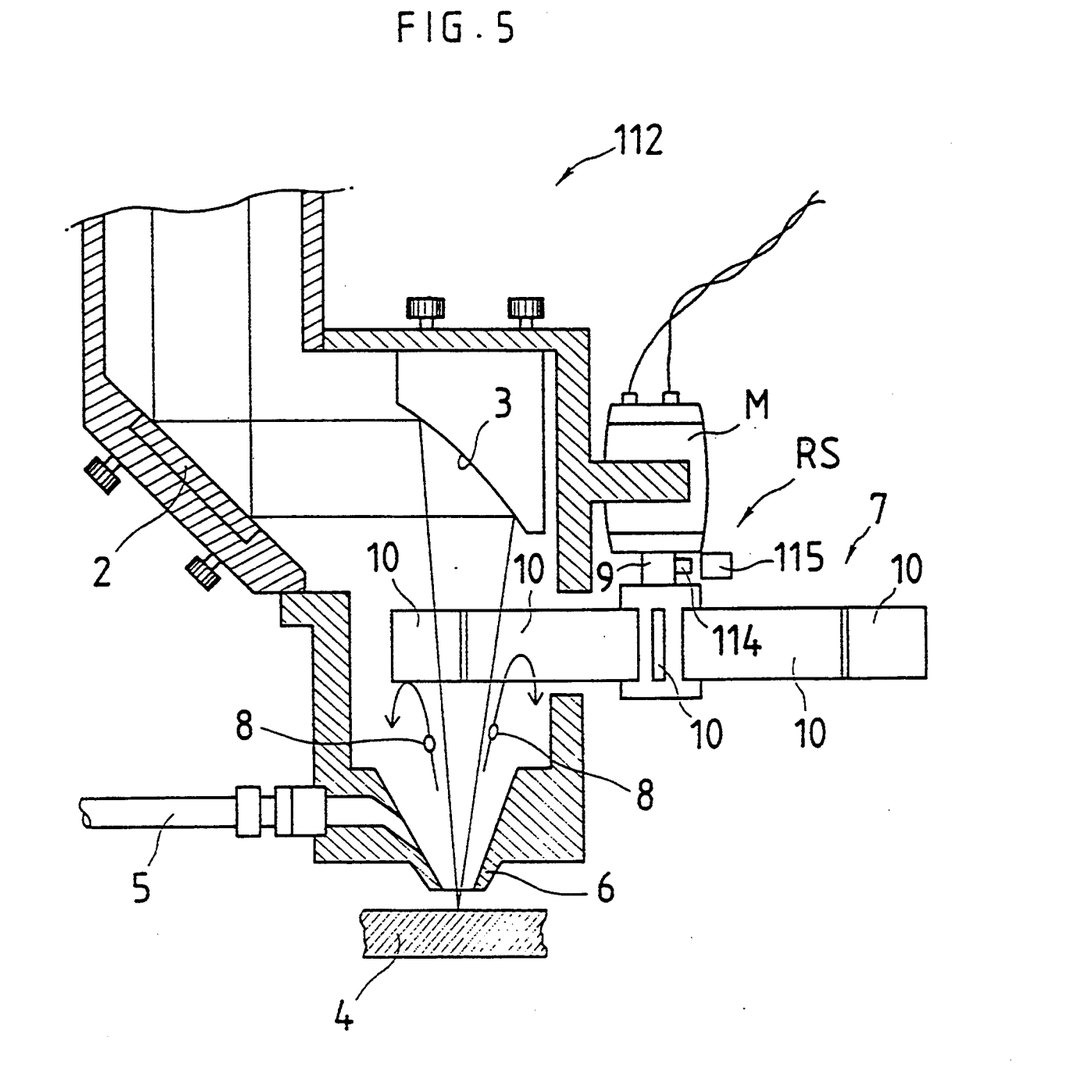
FIG. 5 is a sectional side elevation schematically showing a principal part of the laser beam machine according to the embodiment.

An embodiment according to the present invention will be described with reference to the drawings. FIG. 5 is a sectional side elevation schematically showing a machining head 112, along with its peripheral parts, of a laser beam machine 111 according to the embodiment. The machining head 112 has a mirror 2 and a parabolic mirror 3 forming a light path, as in the prior art shown in FIG. 7, and a laser beam emitted from a laser oscillator is reflected at the mirror 2 in the machining head 112 toward the parabolic mirror 3 to be focused by the parabolic mirror 3, thereby irradiating a workpiece 4 to be machined. Also, an assist gas is introduced into the machining head 112 through a pipe 5, and then supplied to the workpiece 4 after being throttled by a nozzle 6 of the machining head 112. The workpiece 4 is melted and machined due to the effect of the interaction of the laser beam and the assist gas. An impeller 7, which is rotated at high speed by a motor M as rotating means, is arranged between the parabolic mirror 3, which is the endmost optical component for the laser beam emission, and the workpiece 4. During a machining operation, the impeller 7 is rotated at such a speed that, while contaminant 8 scattering from the surface of the workpiece 4 passes across the rotating surface of the impeller 7, the impeller 7 rotates at least by an angle corresponding to a pitch at which a plurality of vanes 10 are mounted to a rotary shaft 9 thereof in radial form. Thus, contaminants 8 scattering from the workpiece 4 and entering the rotating region of the impeller 7 are repelled by the vanes 10, whereby the contaminants 8 are prevented from reaching the parabolic mirror 3.

A rotational speed sensor RS is arranged in the vicinity of the impeller 7 for detecting an increase of the rotational speed of the impeller 7 to a predetermined speed. In this respect, the embodiment differs from the prior art shown in FIG. 7. The rotational speed sensor RS of this embodiment comprises an iron piece 114 securely attached to a portion of the outer periphery of the shaft 9, a proximity sensor 115 for detecting the proximity of the iron piece 114, etc. The proximity cycle of the iron piece 114, which approaches and separates from the proximity sensor 115 as the shaft 9 rotates, is detected by means of the proximity sensor 115, a frequency/velocity converter, etc., whereby the rotational speed of the shaft 9, i.e., the rotational speed of the impeller 7, is detected. The final output of the rotational speed sensor RS turns "ON" only when the rotational speed of the impeller 7 reaches a certain speed (the predetermined rotational speed) at which contaminants 8 scattering from the workpiece 4 can be repelled by the vanes 10. The laser beam machine 111 is composed of the aforementioned machining head 112, assist gas supply means (not shown), the laser oscillator (not shown), etc., and is mounted on an industrial robot 113 as an end effector.

Figure 6:
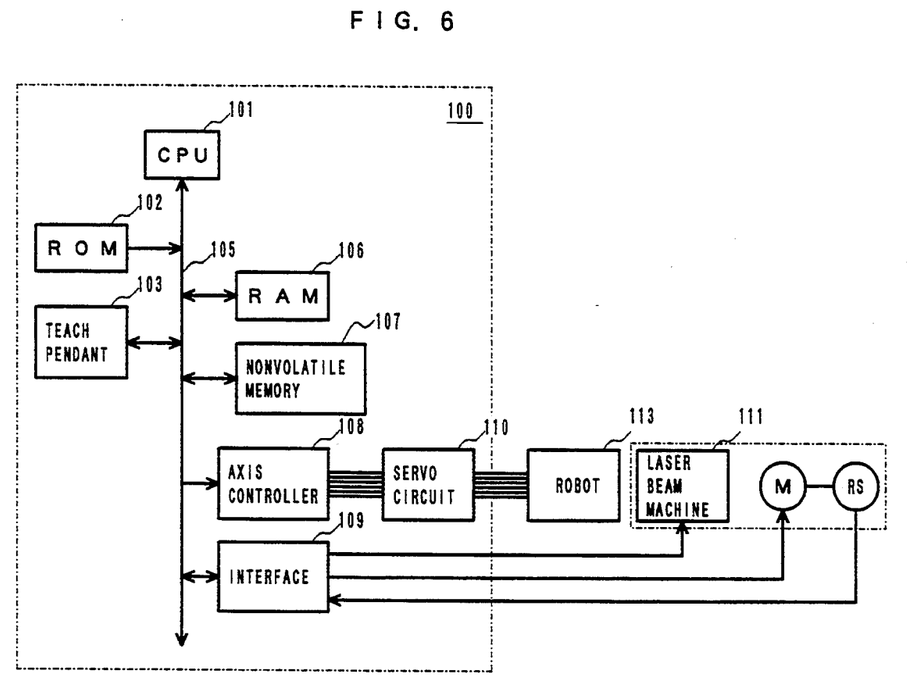
FIG. 6 is a block diagram schematically showing a principal part of a robot controller which also serves as a control section for the laser beam machine according to the embodiment.

FIG. 6 is a block diagram schematically illustrating a principal part of a robot controller 100 which also functions as a control section for the laser beam machine 111. The robot controller 100 includes a microprocessor 101. The microprocessor 101 is connected via a bus 105 to a ROM 102 storing control programs etc., a RAM 106 used for temporary storage of data, etc., a nonvolatile memory 107 for storing a machining program consisting of motion programs and the like created by teaching operation, a teach pendant 103 by means of which motions are taught to the industrial robot 113 and statements etc. necessary for controlling the machining operation of the laser beam machine 111 are inserted in the motion programs created by the teaching operation, an axis controller 108 for controlling the actuation of individual axes of the industrial robot 113 through a servo circuit 110, an input/output interface 109, etc. The operations of the laser oscillator, assist gas supply means, motor M for rotating the impeller 7, etc., which are associated with the laser beam machine 111, are controlled by the microprocessor 101 of the robot controller 100 via the input/output interface 109. The signal from the rotational speed sensor RS is supplied to the microprocessor 101 through the input/output interface 109.

FIGS. 1 through 4 are flowcharts illustrating the outline of a playback operation analyzing processing stored in the ROM 102. The following program is an example of the machining program prepared based on the teaching operation and the statement entry operation through the teach pendant 103, shown in comparison with an example of conventional one.

1. L P[1] 100 mm/sec FINE
2. LASER L START
3. L P[2] 100 mm/sec CONT 100
4. L P[3] 100 mm/sec FINE
5. LASER END
6. [END]

Figure 1:
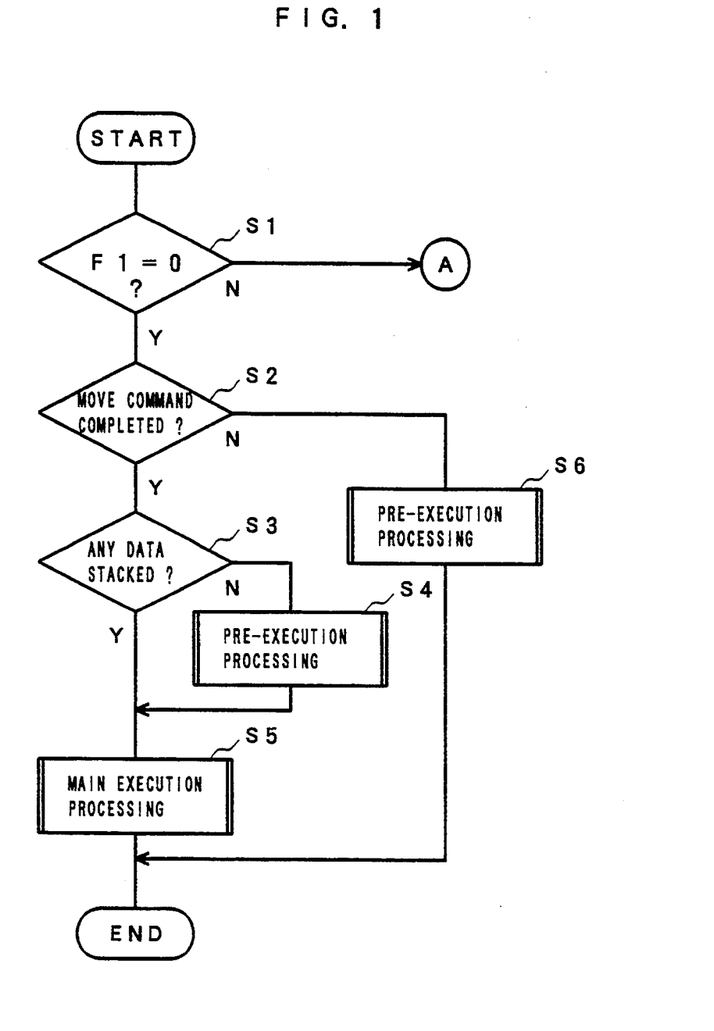
FIG. 1 is a flowchart illustrating the outline of a playback operation which analyses processing executed by a laser beam machining apparatus according to one embodiment of the present invention.
Figure 2:
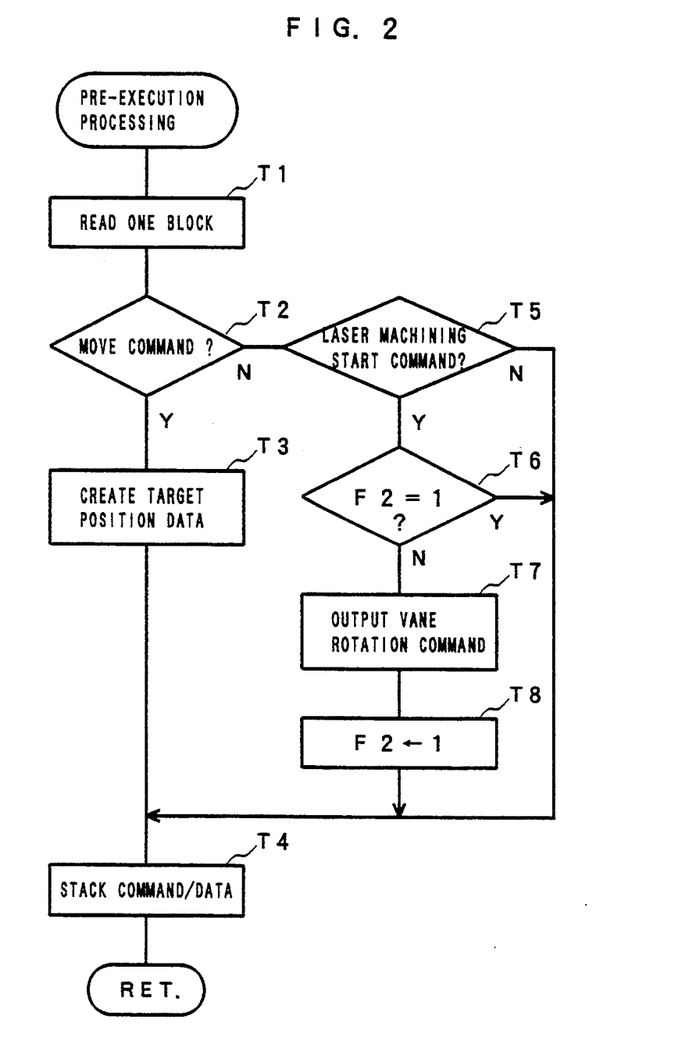
FIG. 2 is a flowchart showing a principal part of a pre-execution processing in the playback operation analyzing processing.

According to the playback operation analyzing processing of this embodiment, it is not necessary to prepare the machining program by defining the command "DO[1]=ON" or "DO[1]=OFF" for ON/OFF control of the motor M which rotates the impeller 7. Instead, the operator has only to teach target positions P[1], P[2] and P[3] and like data by operating the teach pendant 103, and to enter commands relating to moving speed, interpolation type, etc. and statements specifying the start and end of laser beam machining, etc., through the teach pendant 103. In the following, the processing to be executed in carrying out the machining operation will be described referring to the processings shown in FIGS. 1 through 4 which are to be executed repetitively through the microprocessor 101 at predetermined intervals in the playback operation mode. After starting the processing for playback operation, the microprocessor (hereinafter merely referred to as "CPU") 101 first determines whether the value of an operating state storage flag F1 remains at an initial value of "0" (Step S1), since immediately after the playback operation analyzing processing has just been started, the flag equals zero, i.e., F1=0. The CPU 101 then determines whether an axis interpolation processing for a move command to be executed has been completed, that is, whether movement (feed) of the machining head 112 to a currently taught point, which is a target position, has been completed (Step S2). Immediately after the playback operation analyzing processing is started, a target position or a move command is not yet read, and thus the deviation between the current and target positions is zero, as in the case where the movement of the machining head is completed; therefore, the result of the determination in Step S2 becomes YES (Y). Then, the CPU 101 proceeds to Step S3, wherein it determines whether any execution data created by a pre-execution processing (pre-processing step) is stacked in the RAM 106. At this point of time, however, no pre-execution processing has been carried out, and thus no stacked execution data is detected. Therefore, the CPU 101 executes, as pre-processing step, the pre-execution processing in Step S4, details of which are shown in FIG. 2.

On starting the pre-execution processing, the CPU 101 first reads one-statement data of the machining program, which is previously stored in the nonvolatile memory 107 by the aforementioned operations, from the beginning thereof (Step T1) to determine whether the declaration thus read includes a move command (Step T2). In the example given above, the statement "L P[1] 100 mm/sec FINE" at line 1 is read. Since this statement is a move command specifying a straight-line movement to the taught point P[1] for positioning, the result of the decision in Step T2 becomes YES; therefore, the CPU 101 obtains a deviation of the current position of the machining head 112 from the target position P[1] for each of the axes to create execution data (Step T3), and stacks the created data in the RAM 106 as target position data (Step T4).

Figure 3:
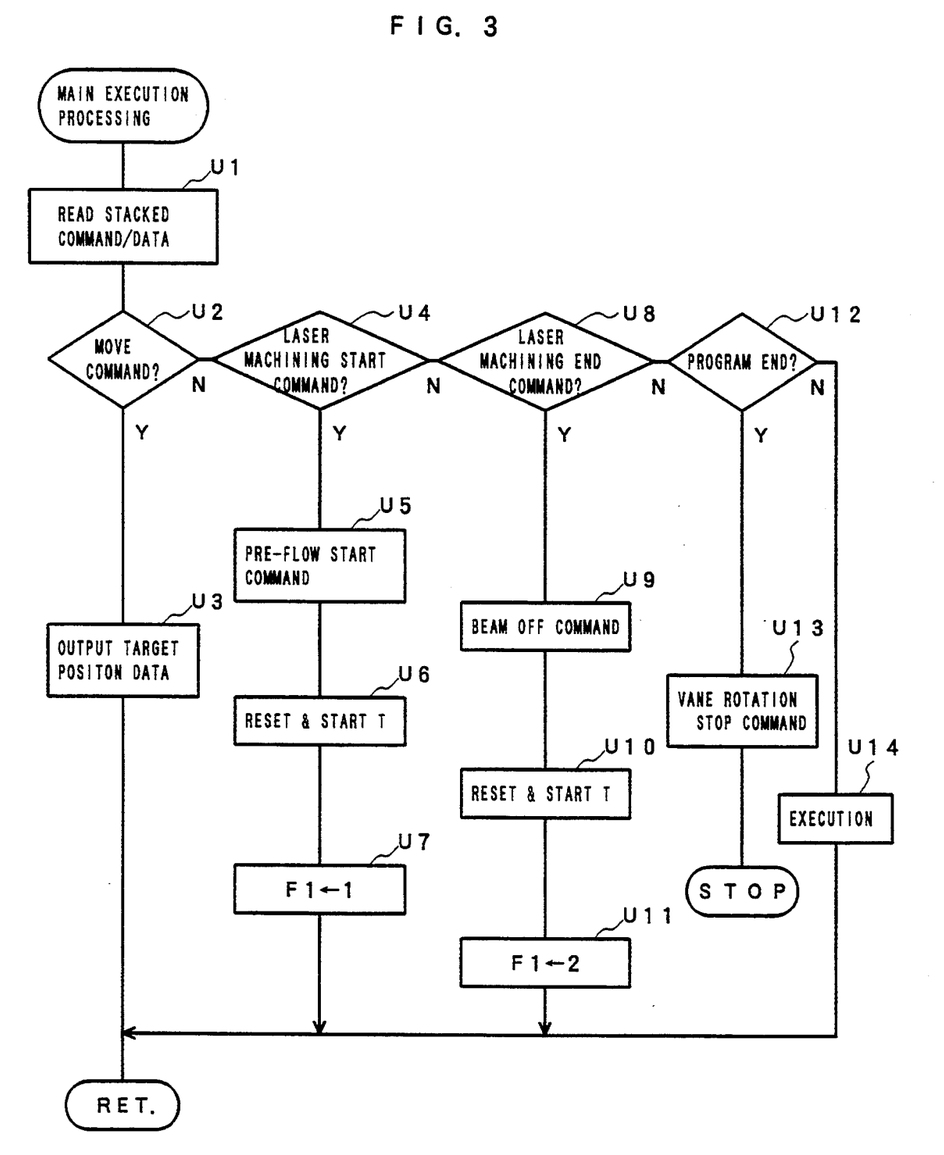
FIG. 3 is a flowchart showing a principal part of a main execution processing in the playback operation analyzing processing.
Figure 4:
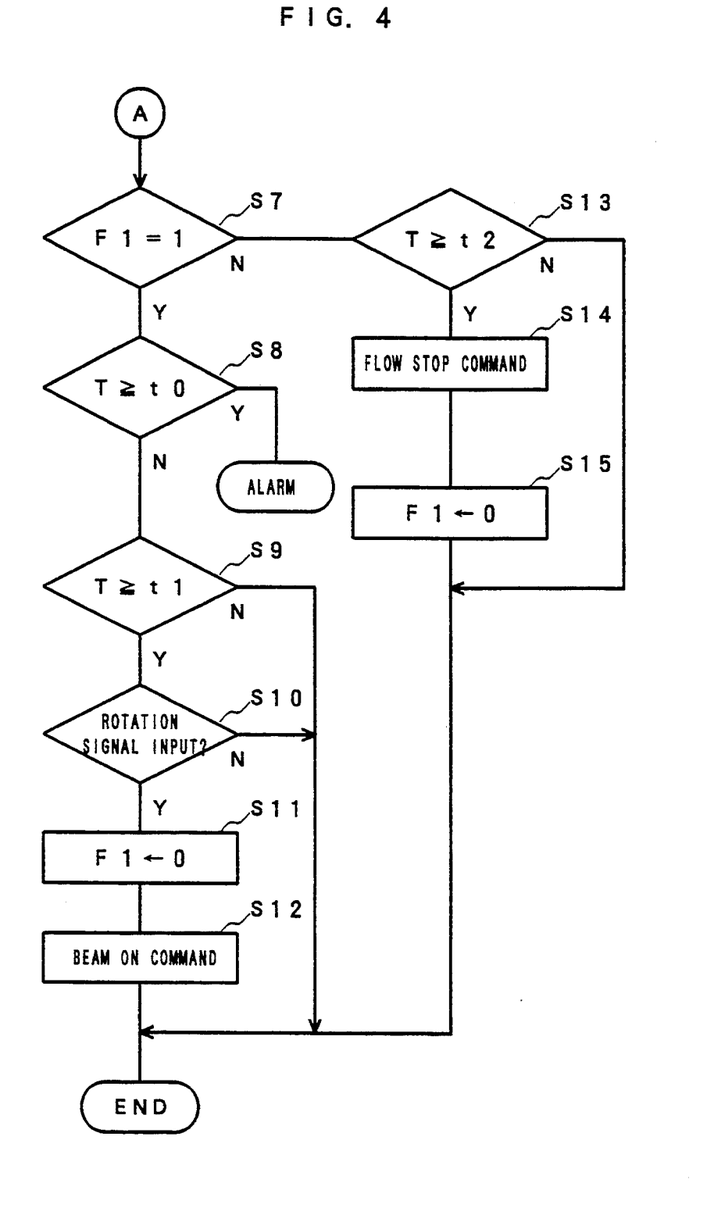
FIG. 4 is a flowchart illustrating the outline of the remaining part of the playback operation analyzing processing.

After the target position data for use as execution data is created, the CPU 101 executes the pre-execution processing, and proceeds to Step S5 to carry out a main execution processing, details of which are shown in FIG. 3. On starting the main execution processing, the CPU 101 reads one block of the execution data, which is stacked in the RAM 106, from the beginning thereof (Step U1) to determine whether the execution data thus read includes a move command (Step U2). Since, in this case, the execution data to be read includes the move command specifying the straight-line movement to the taught point P[1] for positioning, the CPU 101 transfers the stacked execution data to the task of axis interpolation processing (Step U3), and starts the straight-line movement to the target position P[1] by means of the axis interpolation processing. If any other items of execution data are stacked in the RAM 106, they are shifted one rank toward the top position of the stack.

After completing the main execution processing (Step S5), the CPU 101 ends the current cycle of playback operation analyzing processing, and then again executes the playback operation analyzing processing from the beginning thereof for the subsequent processing period. In this case, since the value of the operating state flag F1 has not been changed, the result of the decision in Step S1 again becomes YES. Then, the CPU 101 determines whether the axis interpolation processing for the move command under execution has been completed, that is, whether the movement of the machining head 112 to the currently taught point P[1] as the target position has been completed (Step S2). If next target position data is outputted before the movement of the machining head 112 to the taught point (target position) P[1] is completed, the path of movement of the machining head 112 is cut short, making it impossible to position the head 112 at the taught point P[1].

Therefore, when the result of the decision in Step S2 becomes NO (N), the CPU 101 will not execute Steps S3–S5, thereby prohibiting the output of new execution data, and proceeds to Step S6 to carry out the pre-execution processing. After starting the pre-execution processing, details of which are shown in FIG. 2, the CPU 101 reads the next statement of the machining program from the nonvolatile memory 107, as stated above (Step T1). The statement read in this case, i.e., the statement at line 2, is not a move command but the specification statement "LASER START" which specifies the start of laser beam machining. Accordingly, the CPU 101 proceeds from Step T2 to Step T5, and then executes Step T6 wherein it determines whether a vane rotation flag F2 is set (F1=1), that is, whether a rotation start command has already been outputted to the motor M as the rotating means for the impeller 7. At this point of time, however, the vane rotation flag F2 retains the initial value "0"; therefore, the result of the decision in Step T6 becomes NO. Accordingly, the CPU 101 outputs a rotation start command to the motor M via the input/output interface 109 to cause the impeller 7 to start rotating (Step T7), and then sets the vane rotation flag F2 to "1" (Step T8). Subsequently, the CPU 101 stacks a laser beam machining start command, which is execution data, in the RAM 106 (Step T4), and ends the current cycle of playback operation analyzing processing. The CPU 101 again executes the playback operation analyzing processing from the beginning thereof for the next processing period. In this case, since the value of the operating state flag F1 has not been changed yet, the result of the decision in Step S1 again becomes YES. Accordingly, the CPU 101 determines whether the axis interpolation processing for the move command under execution has been completed, that is, whether the movement of the machining head 112 to the currently taught point P[1] as the target position has been completed (Step S2).

As long as the straight-line movement to the target position P[1] is not completed, and thus the result of the decision in step S2 is NO, the CPU 101 repetitively executes only the steps, namely, the Step 1 for the playback operation analyzing processing, Step 2 for the processing for decision, and Step 6 for the pre-execution processing, until the task of the axis interpolation processing and the movement to the target position are completed, whereby the machining program is successively read, one statement at a time, from the nonvolatile memory 107, and the execution data such as the target position data is created and stacked in the RAM 106, as described above.

If the straight-line movement to the target position P[1] for positioning is completed, and thus the result of the decision in Step S2 becomes YES while Steps S1, S2 and S6 are repeatedly executed, the CPU 101 determines whether any execution data created by the pre-execution processing is stacked in the RAM 106 (Step S3). In this case, the result of the decision in Step S3 becomes YES, because several items of execution data have been created by the aforementioned pre-execution processing and stacked in the RAM 106 while the axis interpolation processing is carried out for the straight-line movement to the target position P[1]. Accordingly, the CPU 101 executes the main execution processing in Step S5, details of which are shown in FIG. 3, and reads the first block of the execution data stacked in the RAM 106 (Step U1). The CPU 101 then determines whether the read execution data includes a move command (Step U2); in this case, the execution data includes the laser beam machining start command corresponding to the statement "LASER START". Therefore, the CPU 101 proceeds from Step U2 to Step U4, the processings for determination, and executes Step U5 wherein it outputs a pre-flow command to the laser beam machine 111 via the input/output interface 109, thereby operating the assist gas supply means to initiate pre-flow. Simultaneously, the CPU 101 starts an elapsed time measuring timer T to measure the time elapsed from the start of pre-flow (Step U6), sets the value of the operating state flag F1 to "1", which indicates that the pre-flow is under execution (Step U7), and ends the current cycle of playback operation analyzing processing.

The operating state flag F1 is now set to "1" by the above processing; therefore, in the subsequent cycle of playback operation analyzing processing, the CPU 101 proceeds from Step S1 to Step S7. Currently, the flag equals "1" (F1=1), and accordingly, the CPU 101 proceeds from Step S7 to Step S8, wherein it determines whether the value indicated by the elapsed time measuring timer T has reached a predetermined standby allowance time t0, which is saved for increase of the rotational speed of the impeller 7 up to the predetermined speed. If the value of the standby allowance time t0 is not exceeding the value of the elapsed time measuring timer T, the CPU 101 determines whether the value of the elapsed time measuring timer T has reached a pre-flow set time t1 (Step S9). If the pre-flow set time t1 is not reached yet, the CPU 101 repeatedly executes only Steps S1 and S7 to S9 in the following cycles of playback operation analyzing processing until the value of the elapsed time measuring timer T reaches the pre-flow set time t1 (t0>t1).

If the value of the elapsed time measuring timer T has reached the pre-flow set time t1, and thus the result of the decision in Step S9 becomes YES while the above steps are repeatedly executed, the CPU 101 proceeds to Step S10 and determines whether a rotational speed attainment signal has been inputted from the rotational speed sensor RS, that is, whether the rotational speed of the impeller 7 has reached a rotational speed high enough to repel contaminants 8 with the vanes 10 thereof (Step S10). If, at this stage, no rotational speed attainment signal is supplied from the rotational speed sensor RS, the CPU 101 terminates the current cycle of playback operation analyzing processing, and then repeatedly executes only Steps S1 and S7 to S10 in the following cycles of playback operation analyzing processing until a rotational speed attainment signal is supplied from the rotational speed sensor RS or the value of the elapsed time measuring timer T exceeds the predetermined standby allowance time t0.

If the input of a rotational speed attainment signal from the rotational speed sensor RS is detected before the value of the elapsed time measuring timer T exceeds the predetermined standby allowance time t0, that is, if the result of the decision in Step S10 becomes YES, the CPU 101 judges that the start of a melting processing by means of laser beam emission has become possible.

Then, the CPU 101 sets the value of the operating state flag F1 to "0" to permit movement of the machining head 112 (Step S11), outputs a laser beam machining command to the laser beam machine 111 to operate the laser oscillator, thereby starting the laser beam emission (Step S12), and ending the current cycle of playback operation analyzing processing. In the event no rotational speed attainment signal is supplied from the rotational speed sensor RS even when the value of the elapsed time measuring timer T has reached the predetermined standby allowance time t0, that is, if the result of the decision in Step S8 become YES, the CPU 101 judges that the predetermined rotational speed cannot be attained because of abnormality of the impeller 7 or the motor M serving as the driving means, thereby outputting an abnormality alarm to actuate a warning device or the like for stopping the processing.

In the case where the input of a rotational speed attainment signal from the rotational speed sensor RS is detected before the value of the elapsed time measuring timer T exceeds the predetermined standby allowance time t0, the operating state flag F1 is set to "0"; therefore, in the subsequent cycle of playback operation analyzing processing, the result of the decision in Step S1 becomes YES. Further, at this point of time, the straight-line movement to the target position P[1] for positioning is already completed, and thus the result of the decision in Step S2 becomes YES. Accordingly, the CPU 101 determines whether any execution data created by the pre-execution processing is stacked in the RAM 108 (Step S3). If execution data corresponding to the statement at line 3 or after is already created by the pre-execution processing and is stacked in the RAM 108, the CPU 101 carries out the main execution processing in Step S5 based on an item of the execution data at the top position in the stack, as described above; if no execution data is stacked, one-statement data of the machining program is read from the nonvolatile memory 107 to create new execution data (Step S4), as mentioned above, and based on thus obtained execution data, the CPU 101 carries out the main execution processing in Step S5. In the example given above, execution data corresponding to the statement "L P[2] 100 mm/sec CONT 100" at line 3 is read (Step U1). Since this execution data includes a move command indicating a straight-line movement to the taught point P[2], the result of the decision in Step U2 becomes YES. Accordingly, the CPU 101 transfers the execution data, which specifies the straight-line movement from the taught point P[1] to P[2], to the task of axis interpolation processing as the target position data (Step U3), and the straight-line movement from the current position P[1] to the target position P[2] is started by means of the axis interpolation processing. In the case where other items of execution data are stacked in the RAM 106, they are shifted one rank toward the top position of the stack.

After performing the main execution processing in Step S5, the CPU 101 ends the current cycle of playback operation analyzing processing, and again executes the playback operation analyzing processing from the beginning thereof for the next cycle. Since, in this case, the value of the operating state flag F1 remains unchanged, the result of the decision in Step S1 again becomes YES. Thus, in accordance with the result of the determination as to whether the axis interpolation processing for the move command under execution has been completed (Step S2), and the result of the determination as to whether any execution data is stacked in the RAM 106 (Step S3), the CPU 101 selectively carries out the main execution processing (Step S5) involving transfer of the target position data for effecting the next movement, etc., or the pre-execution processing (Step S4) involving creation of execution data for use in the main execution processing, in each of the processing cycles, whereby the straight-line movement from the taught point P[1] to P[2] and the straight-line movement from taught point P[2] to P[3] for positioning are carried out by means of the axis interpolation processing.

If it is judged in Step S2 of a later cycle of playback operation analyzing processing that the straight-line movement to the taught point P[3] for positioning has been completed, the CPU 101 reads, in the main execution processing of Step S5, execution data for a laser beam machining end command, which is created in Step S6 or S4 in accordance with the statement "LASER END" at line 5, from the stack in the RAM 106 (Step U1). The CPU 101 then determines whether the execution data thus read includes a move command (Step U2). In this case, since the execution data to be read is a laser beam machining end command, the CPU 101 proceeds to step U9 after undergoing the processings for determination in Steps U2, U4 and U8, whereupon it outputs a laser beam machining stop command to the laser beam machine 111 through the input/output interface 109, to stop the operation of the laser oscillator and to thereby cease substantial emission of the laser beam (in some cases, the laser output is switched to lower power). Simultaneously, the CPU 101 starts the elapsed time measuring timer T to measure an after-flow time following the stop of the laser beam machining (Step U10), sets the operating state flag F1 to the value "2", which indicates that the after-flow is under execution (Step U11), and ends the current cycle of playback operation analyzing processing.

When the operating state flag F1 is set to "2", in the subsequent cycle of playback operation analyzing processing, the CPU 101 proceeds from Step S1 to Step S13 after undergoing the processing for determination in Step S7, and determines whether the value of the elapsed time measuring timer T has reached an after-flow set time t2. If the after-flow set time t2 is not reached by the value of the elapsed time measuring timer T, the CPU 101 thereafter repeatedly executes only Steps S1, S7 and S13 in the following cycles of playback operation analyzing processing until the value of the elapsed time measuring timer T reaches the after-flow set time t2, thereby letting the after-flow set time t2 pass.

When, while the above steps are repeatedly executed, the value of the elapsed time measuring timer T reaches the after-flow set time t2 and thus the result of the decision in Step S13 becomes YES, the CPU 101 proceeds to Step S14 for determination processing, wherein it outputs a flow stop command to the laser beam machine 111 to stop the operation of the assist gas supply means, sets the operating state flag F1 again to the initial value "0" (Step S15), and ends the current cycle of playback operation analyzing processing.

In the subsequent cycle of playback operation analyzing processing, the results of the decisions in Steps S1 and S2 both become YES; therefore, in the main execution processing of Step S5, execution data for a program end command, which is created in Step S6 or S4 in accordance with the statement "[END]" at line 6, is read from the stack in the RAM 106 (Step U1). In this case, since the read execution data includes an end command indicating a program end, the CPU 101 proceeds to Step U13 after undergoing the processing for determinations in Steps U2, U4, U8 and U12, and outputs a rotation stop command to the motor M through the input/output interface 109 to stop the rotation of the impeller 7, thus completing the entire machining operation. In cases where execution data other than the move command, laser beam machining start command, laser beam machining end command, and program end command is read during the main execution processing, for example, execution data for ON/OFF control of external equipment is read, such data is processed in Step U14, in a conventional manner.

As described above, according to the playback operation analyzing processing of this embodiment, it is unnecessary to separately define "DO[1]=ON", "DO[1]=OFF" and the like, which are general-purpose commands for ON/OFF control of external equipment, in order to control the operation of the impeller 7; the rotation of the impeller 7 is controlled by means of the laser beam machining start and end commands which are indispensable to the creation of a laser beam machining program. Therefore, rotation of the impeller 7, which is essential to the protection of optical components, can be controlled without any inconvenience caused by omission of command codes, erroneous setting or the like.

When a laser beam machining command is detected during the pre-execution processing which is a pre-processing step for creating execution data, a rotation command is outputted to the motor M. Thus, an idle time during which the axis interpolation processing is executed for the movement to the laser beam machining start position is also used for the acceleration of the impeller 7, whereby the loss of time in increasing the rotational speed can be lessened, as compared with the conventional control method in which the rotation of the impeller 7 is started only after completion of the positioning. Further, it is designed that the rotation of the impeller 7 is stopped by means of a program end command, not by a laser beam machining end command; therefore, the impeller 7 can be kept rotating even in the case where the emission of the laser beam is suspended by the laser beam machining end command. Accordingly, it is not necessary to increase again the rotational speed of the impeller 7 each time the laser beam machining start command is detected, and thus the overall cycle time can further be shortened.

Furthermore, since the substantial laser beam machining operation is started after it is ascertained that the rotational speed of the impeller 7 has reached the predetermined speed, contamination of optical components due to insufficient rotational speed can be avoided.

We claim:

1. A laser beam machining control method for a laser beam machine comprising a contaminant repellent unit arranged between a workpiece to be machined and an optical component forming a light path for a laser beam, and actuation control means for operating the contaminant repellent unit, wherein a drive command is outputted to the actuation control means when a laser beam machining command is detected in a pre-processing step in which a machining program is analyzed to create execution data for carrying out a laser beam machining operation; and laser beam machining operation is started when it is detected that the contaminant repellent unit has attained a predetermined operating condition within a predetermined time period, and an alarm is outputted when the contaminant repellent unit does not attain the predetermined operating condition within the predetermined time period.

2. A laser beam machining control method for a laser beam machine comprising an impeller arranged between a workpiece to be machined and an optical component forming a light path for a laser beam, and drive means for rotating the impeller at high speed, wherein a drive for rotation command is outputted to the drive means for rotating when a laser beam machining command is detected in a pre-processing step in which a machining program is analyzed to create execution data for carrying out a laser beam machining operation; and laser beam machining operation is started when it is detected that rotation of the impeller has reached a predetermined rotational speed within a predetermined time period, and an alarm is outputted when the rotation of the impeller does not reach the predetermined rotational speed within the predetermined time period.

3. A laser beam machining control apparatus comprising:

a contaminant repellent unit arranged between a workpiece to be machined and an optical component forming a light path for a laser beam, which is emitted through operation of a laser oscillator;

an operation control means for switching on and off said contaminant repellent unit in accordance with a laser beam machining start command and a laser beam machining end command, respectively;

an operating state detecting means for detecting an operating state of said contaminant repellent unit;

a signal output means for generating a signal when the operating state detected by said operating state detecting means has attained to a preset state; and a machining start commanding means for providing an operation start command to the laser oscillator upon detecting the signal from said signal output means.

4. The laser beam machining control apparatus according to claim 3, further comprising, a time measuring means for measuring a time elapsed from generation of the laser beam machining start command, and an alarm output means for outputting an alarm when supplied with no signal from said signal output means within a preset time period.

5. A laser beam machining control apparatus comprising:

an impeller arranged between a workpiece to be machined and an optical component forming a light path for a laser beam, which is emitted through operation of a laser oscillator;

an operation control means for switching on and off said impeller in accordance with a laser beam machining start command and a laser beam machining end command, respectively;

a rotational speed detecting means for detecting a rotational speed of said impeller;

a signal output means for generating a signal when the rotational speed detected by said rotational speed detecting means has reached a preset rotational speed; and a machining start commanding means for providing an operation start command to the laser oscillator upon detecting the signal from said signal output means.

6. The laser beam machining control apparatus according to claim 5, further comprising, a time measuring means for measuring a time elapsed from generation of the laser beam machining start command, and an alarm output means for outputting an alarm when supplied with no signal from said signal output means within a preset time period.

* * * * *

UNITED STATES PATENT AND TRADEMARK OFFICE
CERTIFICATE OF CORRECTION

PATENT NO. : 5,432,316
DATED : July 11, 1995
INVENTOR(S) : Ito et al.

It is certified that error appears in the above-indentified patent and that said Letters Patent is hereby corrected as shown below:

Title page,
Delete section beginning with "OTHER PUBLICATIONS through (List continued on next on next page.)"
Delete all of page 2.
Col. 9, line 34, change "108" to --106--.

Signed and Sealed this

Thirtieth Day of January, 1996

Attest:

BRUCE LEHMAN

Attesting Officer

Commissioner of Patents and Trademarks